US007929752B2

(12) United States Patent
Je et al.

(10) Patent No.: US 7,929,752 B2
(45) Date of Patent: Apr. 19, 2011

(54) METHOD FOR GENERATING STRUCTURED-LIGHT PATTERN

(75) Inventors: Changsoo Je, Seoul (KR); Sang Wook Lee, Seoul (KR)

(73) Assignees: Nano Picture Co., Ltd., Seoul (KR); Sogang University, Seoul (KR)

( * ) Notice: Subject to any disclaimer, the term of this patent is extended or adjusted under 35 U.S.C. 154(b) by 564 days.

(21) Appl. No.: 10/971,390

(22) Filed: Oct. 22, 2004

(65) Prior Publication Data

US 2005/0116952 A1    Jun. 2, 2005

(30) Foreign Application Priority Data

Oct. 31, 2003 (KR) .................. 10-2003-0076723
Oct. 31, 2003 (KR) .................. 10-2003-0076724

(51) Int. Cl.
*G06K 9/00* (2006.01)
(52) U.S. Cl. ....................... 382/162; 382/154
(58) Field of Classification Search .................. 382/162, 382/154, 203, 106, 101, 149; 345/419, 103; 356/601, 603, 610, 613; 348/E13.005, E13.014, 348/E13.018; 250/559.22, 559.36; 349/9; 353/34

See application file for complete search history.

(56) References Cited

U.S. PATENT DOCUMENTS

| 6,897,876 B2 * | 5/2005 | Murdoch et al. | 345/589 |
| 6,961,045 B2 * | 11/2005 | Tsao | 345/103 |
| 7,019,848 B2 * | 3/2006 | Mamiya | 356/601 |
| 7,092,563 B2 * | 8/2006 | Shiratani | 382/154 |

OTHER PUBLICATIONS

Documentation entitled "Experiments with the Intensity Ratio Depth Sensor," by Brian Carrihill and Robert Hummel, Computer Vision, Graphics, and Image Processing 32, pp. 337-385, Feb. 26, 1985.
Documentation entitled "Three-Dimensional Surface Measurement by Space Encoding Range Imaging," by Kosuke Sato and Seiji Inokuchi, Journal of Robotic Systems 2(1), pp. 27-39, Nov. 19, 1984.

(Continued)

*Primary Examiner* — Anh Hong Do
(74) *Attorney, Agent, or Firm* — Workman Nydegger

(57) ABSTRACT

A method for generating a structured-light pattern is disclosed, wherein high-resolution real-time three-dimensional (3D) data can be obtained by using a single frame (or one-shot) imaging or double frames (or two-shot) imaging methods. The structured-light pattern for the one-shot imaging is formed of a multiple-stripe color pattern using a color selection scheme and a sequence principle. The proposed color selection scheme reduces the ambiguity in stripe labeling in one-shot imaging, and the proposed sequence principle increases the number of distinguishable stripe codes. The structured-light pattern for two-shot imaging is formed so that three-dimensional (3D) data can be obtained even for objects having strong surface colors with ambient lights, wherein the first two-shot pattern is synthesized, thereby forming a multiple-stripe color pattern using sign codes and a sequence principle under a condition that prevents color-transitions in more than one channels from occurring. Subsequently, the second two-shot pattern is formed by reversing the first two-shot pattern. Accordingly, high-resolution real-time three-dimensional (3D) data, which is insensitive to object shape and surface color, system noise and nonlinearity, can be obtained.

11 Claims, 8 Drawing Sheets

OTHER PUBLICATIONS

Documentation entitled "Design of a Large Depth of View Three-Dimensional Camera on Robot Vision," by Marc Rioux, Grant H. Bechthold, Douglas G. Taylor and Michael D. Duggan, Society of Photo-Optical Instrumental Engineers, pp. 1245-1250, Feb. 11, 1987.

Documentation entitled "Color-Encoded Structured Light for Rapid Active Ranging," by K.L. Boyer and A.C. Kak, IEEE Transactions on Pattern Analysis and Machine Intelligence, vol. PAMI-9, No. 1, pp. 14-28, Jan. 1987.

Documentation entitled "3-D Data Acquisition by Rainbow Range Finder," by Johji Tajima and Masato Iwakawa, IEEE, pp. 309-313, 1990.

Documentation entitled "A Hough Transform for Detecting the Location and Orientation of Three-Dimensional Surfaces Via Color Encoded Spots," by Colin J. Davies and Mark S. Nixon, IEEE Transactions on Systems, Man, and Cybernetics—Part B: Cybernetics, vol. 28, No. 1, pp. 90-95, Feb. 1998.

Documentation entitled "Range Imaging With Adaptive Color Structured Light," by Dalit Caspi and Nahum Kiryati, IEEE Transactions on Pattern Analysis and Machine Intelligence, vol. 20, No. 5, pp. 470-480, May 1998.

Documentation entitled "Color-Encoded Digital Fringe Projection Technique for High-Speed Three-Dimensional Surface Contouring," by Peisen S. Huang, Qingying Hu, Feng Jin and Fu-Pen Chiang, Society of Photo-Optical Instrumental Engineers, pp. 1065-1071, Jun. 1999.

Documentation entitled "Rapid Shape Acquisition Using Color Structured Light and Multi-pass Dynamic Programming," by Li Zhang, Brian Curless and Steven m. Seitz, Department of Computer Science and Engineering, University of Washington, pp. 1-13, date unknown.

Documentation entitled "Toward Optimal Structured Light Patterns," by Eli Horn and Nahum Kiryati, Department of Electrical Engineering, Technion—Israel Institute of Technology, pp. 1-26, date unknown.

Documentation entitled "Stripe Boundary Codes for Real-Time Structured-Light Range Scanning of Moving Objects," by Olaf Hall-Holt and Szymon Rusinkiewicz, Stanford Computer Graphics Lab, Stanford University, pp. 1-8, date unknown.

* cited by examiner

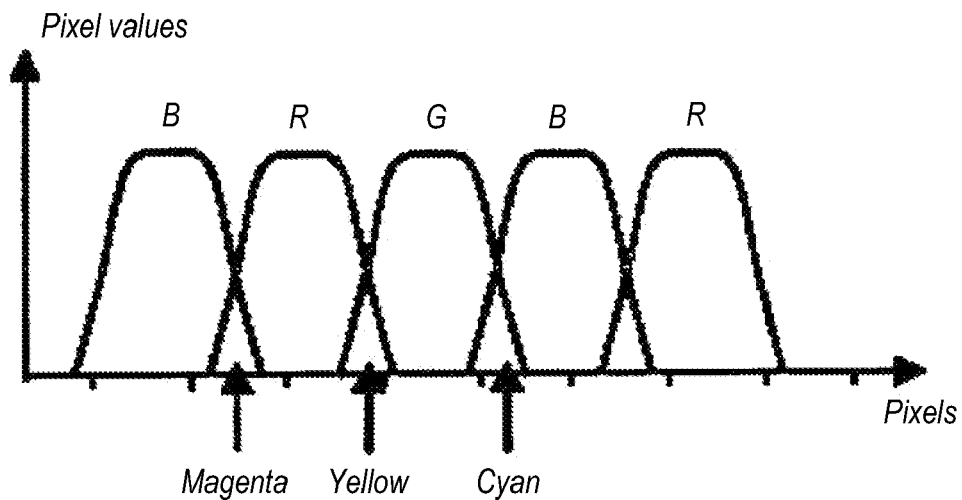
Fig. 3
*(Related Art)*
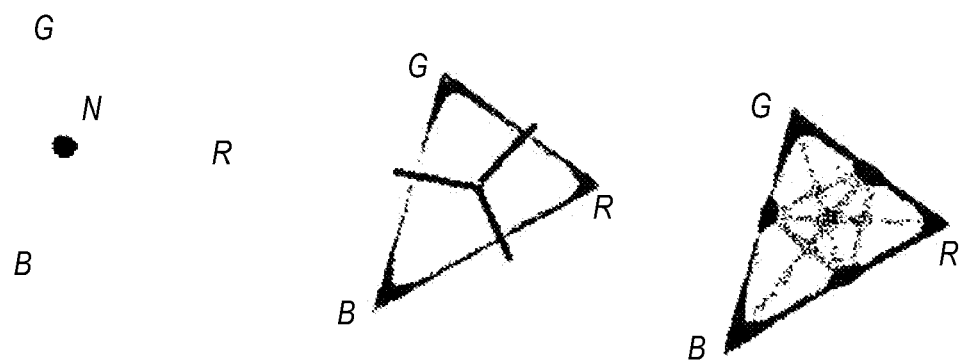
Fig. 4A
*(Related Art)*
Fig. 4B
*(Related Art)*
Fig. 4C
*(Related Art)*

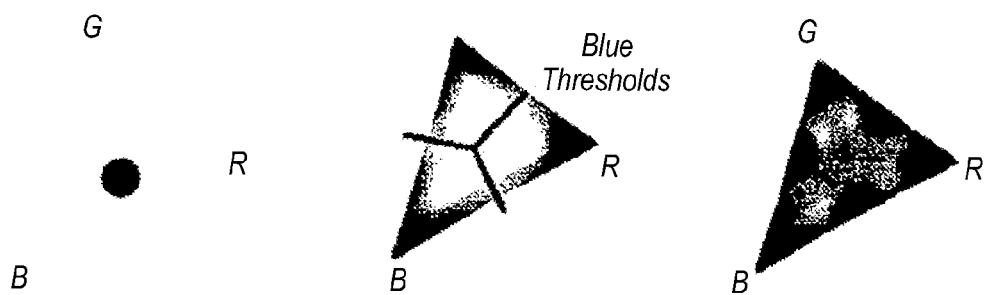
Fig. 5A
(Related Art)
Fig. 5B
(Related Art)
Fig. 5C
(Related Art)
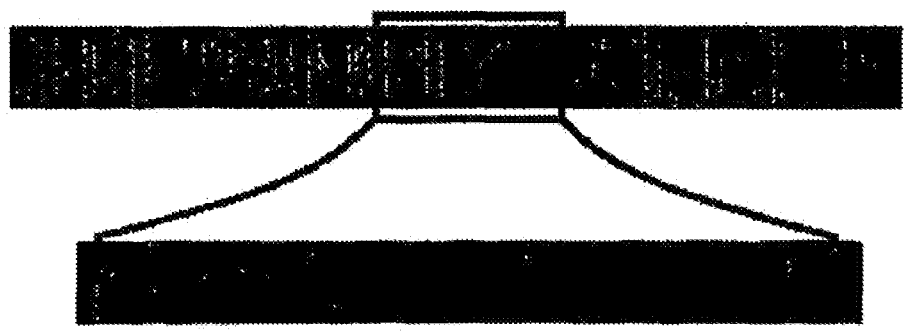
Fig. 6
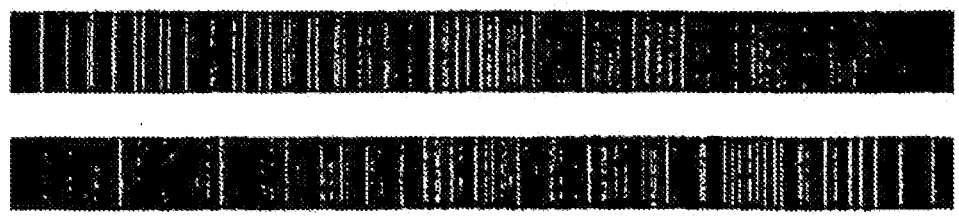
Fig. 7

 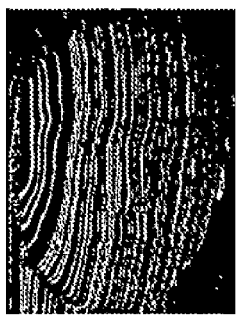 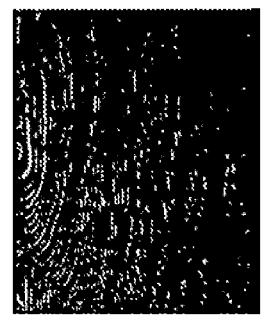 
*Fig. 8A*  *Fig. 8B*  *Fig. 8C*  *Fig. 8D*
  
*Fig. 8E*  *Fig. 8F*  *Fig. 8G*
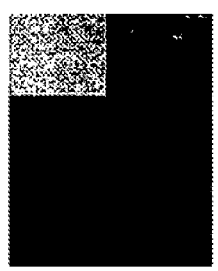   
*Fig. 9A*  *Fig. 9B*  *Fig. 9C*  *Fig. 9D*

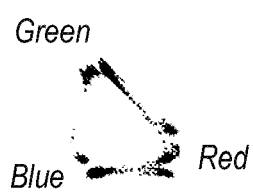 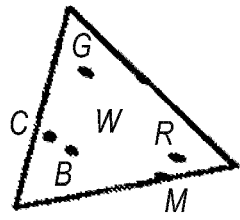 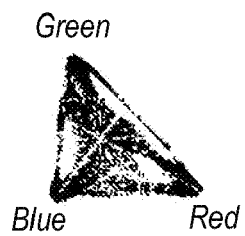 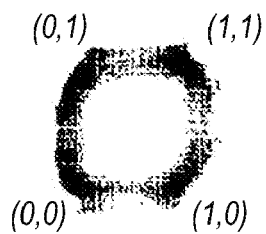
Fig. 10A  Fig. 10B  Fig. 10C  Fig. 10D
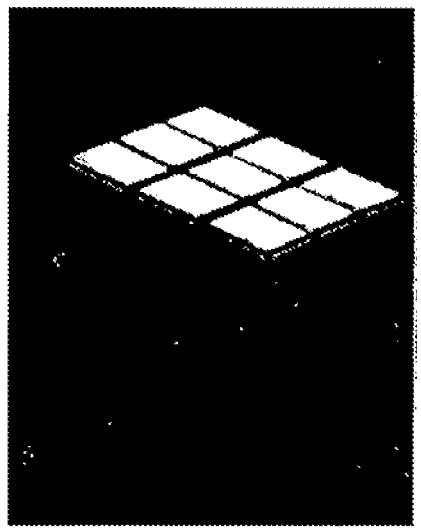 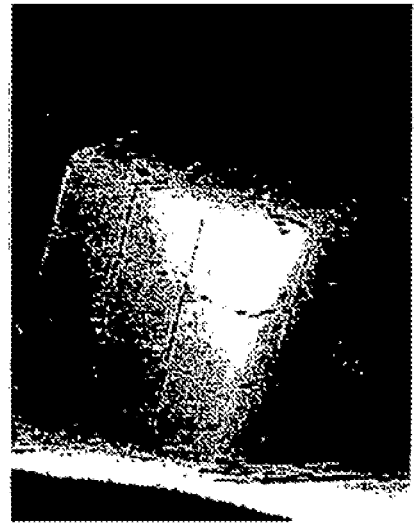
Fig. 11A  Fig. 11B

  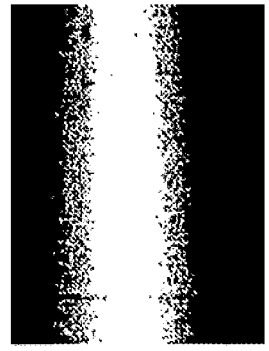 
*Fig. 12A*    *Fig. 12B*    *Fig. 12C*    *Fig. 12D*

Selecting A Number Of Stripes $k$ Determining Each Subpattern from A Number Of Colors $N$ Used In Pattern Synthesis (Wherein $N$ Is Usually 3) And Combining All Of The Subpatterns That Can Be Used, The Subpatterns In Which Any Two Consecutive Strips Have Different Colors

Selecting A First Subpattern, Which Is Anyone Of The Subpatterns Among The Subpatterns, Identifying A Second Subpattern, Which Is A Subpattern Beginning With The Color-Stripe Sequence From The Second Stripe To The Last Stripe Of The First Subpattern, And Overlapping A First Stripe Of the Second Subpattern With The Second Stripe Of The First Subpattern, Identifying A Third Subpattern, Which Is A Subpattern Beginning With The Color Stripe Sequence From The Second Stripe To The Last Stripe Of The Second Subpattern, And Overlapping A First Stripe Of The Third Subpattern With The Second Stripe Of The Second Subpattern, And Repeating The Identifying And Overlapping Step So That Each Of The Subpatterns That Can Be Used Is Overlapped With Another, Thereby Completing The Generation Of Structured Light

*Fig. 13*

```
┌─────────────────────────────────────────────┐
│ Selecting A Number Of Stripes k Determining Each │
│ Subpattern from A Number Of Colors N Used In     │
│ Pattern Synthesis Having A Number Of Possible    │
│ Spatial Color Transitions m (Wherein m Is Equal To│
│ A Number Of Color Channels), Under A Condition   │
│ Wherein Color Transition Is Allowed In Only A Single│
│ Channel Among Stripes Adjacent To One Another,   │
│ Combining All Of The Subpatterns That Can Be     │
│ Used, The Subpatterns In Which Any Two           │
│ Consecutive Strips Have Different Colors         │
└─────────────────────────────────────────────┘
```

```
┌─────────────────────────────────────────────┐
│ Selecting A First Subpattern, Which Is Anyone Of │
│ The Subpatterns Among The Subpatterns, Identifying│
│ A Second Subpattern, Which Is A Subpattern       │
│ Beginning With The Color-Stripe Sequence From    │
│ The Second Stripe To The Last Stripe Of The First│
│ Subpattern, And Overlapping A First Stripe Of the│
│ Second Subpattern With The Second Stripe Of The  │
│ First Subpattern, Identifying A Third Subpattern,│
│ Which Is A Subpattern Beginning With The Color   │
│ Stripe Sequence From The Second Stripe To The    │
│ Last Stripe Of The Second Subpattern, And        │
│ Overlapping A First Stripe Of The Third Subpattern│
│ With The Second Stripe Of The Second Subpattern, │
│ And Repeating The Identifying And Overlapping Step│
│ So That Each Of The Subpatterns That Can Be Used │
│ Is Overlapped With Another, Thereby Generating A │
│ First Two-Shot Pattern                           │
└─────────────────────────────────────────────┘
```

```
┌─────────────────────────────────────────────┐
│ Reversing The First Two-Shot Pattern (i.e., The  │
│ Minimum Value To The Maximum Value, And The      │
│ Maximum Value To The Minimum Value), So As To    │
│ Generate A Second Two-Shot Pattern               │
└─────────────────────────────────────────────┘
```

*Fig. 14*

METHOD FOR GENERATING STRUCTURED-LIGHT PATTERN

CROSS-REFERENCE TO RELATED APPLICATIONS

This application claims the benefit of Korean Application Nos. P2003-076724 and P2003-076723, both filed on Oct. 31, 2003, which are hereby incorporated by reference as if fully set forth herein.

BACKGROUND OF THE INVENTION

1. Field of the Invention

The present invention relates to a structured-light pattern, and more particularly, to a method for generating a structured-light pattern. Although the present invention is suitable for a wide scope of applications, it is particularly suitable for using a single frame or two frames, thereby obtaining high-resolution real-time three-dimensional (3D) data.

2. Discussion of the Related Art

Triangulation-based structured-lighting in one of the most widely used methods of active range sensing and various approaches have been suggested and tested. Recently, interests have been developed in rapid range sensing of moving objects, such as cloth, human face and body in one or slightly more video frames, and much attention has been paid to the use of color to increase the number of distinguishable patterns in an effort to decrease the number of structured-light projections required for ranging a scene. Hereinafter, the design of stripe patterns and the selection of colors to assign to stripe illumination patterns that minimize the effects of object surface colors, system noise, nonlinearity and limitations in camera/projector resolution for real-time range imaging in a single video frame (also referred to as "one-shot") and for near real-time imaging in double video frames (also referred to as "two-shot") will be described.

Among the systems adopting a single illumination source (or projector) and a single camera, as shown in FIG. 1, the systems that project sweeping laser light plane, black-and-white (BW) stripe patterns, gray-level stripes have been well investigated. (See refs.: M. Rioux, G. Bechthold, D. Taylor, and M. Duggan, "Design of a large depth of view three-dimensional camera for robot vision," Optical Engineering, 26(12):12451250, December 1987., K. Sato and S. Inokuchi, "Three-dimensional surface measurement by space encoding range imaging," Journal of Robotic System, 2:2739, 1985., and E. Horn and N. Kiryati, "Toward optical structured-light patterns," Image and Vision Computing, 17, 1999.) Since such systems project multiple light patterns or sweeping laser stripe, the systems are appropriate for stationary scenes. Hall-Holt and Rusinkiewicz have recently suggested a method based on time-varying binary BW patterns for near real-time ranging in four video frames. However, object motion is assumed to be slow to keep "time coherence", which is disclosed in detail by O. Hall-Holt and S. Rusinkiewicz, "Stripe boundary codes for real-time structured-light range scanning of moving objects," Proc. ICCV, 2001.

Various approaches have been made to one-shot or near one-shot imaging. One class of methods is those that project continuous light patterns: Tajima and Iwakawa used rainbow pattern with continuous change of light color (See ref.: J. Tajima and M. Iwakawa, "3-D data acquisition by rainbow range finder," Proc. 10$^{th}$ ICPR, pp. 309-313, Atlantic City, N.J., 1990.), Huang et al. used sinusoidal color fringe light with continuous variation of phase (See ref.: P.S. Huang, Q. Hu, F. Jin, and F. Chiang, "Color-encoded digital fringe projection technique for high-speed three-dimensional surface contouring," SPIE Optical Engineering, Vol. 38(06), pp. 1065-1071, 1999.), and Carrihill and Humel used gray-level ramp and constant illumination (See ref.: B. Carrihill and R. Humel, "Experiments with the intensity ratio depth sensor," Computer Vision, Graphics, and Image Processing, 32:337358, 1985.). Although all of the above-described methods can principally produce range images with high speed and high resolution only restricted by system resolution, they are highly susceptible to system noise, nonlinearity, and object surface colors. Another class of approaches includes those that use discrete color patterns: Davies and Nixon designed a color-dot illumination pattern, Boyer and Kak developed color stripe patterns that can be identified by a color coding of adjacent stripes, and Zhang et al. also develoed a color stripe pattern based on a de Bruijn sequence and stripes are identified by dynamic programming. (See refs.: C. J. Davies and M. S. Nixon, "A hough transformation for detecting the location and orientation of three-dimensional surfaces via color encoded spots," IEEE Trans. On Systems, Man, and Cybernetics, 28(1B), 1998., K. L. Boyer and A. C. Kak, "Color-encoded structured-light for rapid active ranging," IEEE Transactions on Pattern Analysis and Machine Intelligence 9, No. 1, 14-28, 1987., and L. Zhang, B. Curless, S. M. Seitz, "Rapid shape acquisition using color structured-light and multi-pass dynamic programming," 1$^{st}$ International Symposium on 3D Data processing, Visualization, and Transmission, Padova, Italy, Jun. 19-21, 2002.)

Although the color-dot and color-stripe methods are less sensitive to system noise and nonlinearity as compared to those with continuous light patterns, the color-dot and color-stripe methods are also significantly affected by object color reflectance, and their range resolution is limited by stripe width. Caspi et al. presented a three-image-frame method that can overcome the ambiguity in stripe labeling due to object surface color, but its real-time application has not been explicitly considered. (See ref.: D. Caspi, N. Kiryati and J. Shamir, "Range imaging with adaptive color structured-light," IEEE PAMI, Vol. 20, pp. 470-480, 1998.)

Most of the color stripe-based methods suggest design of color patterns that can be uniquely identified in the illumination space, but little explicit attention has been paid to the selection of colors. In this description, we investigate the selection of colors for illumination stripe patterns for maximizing range resolution, and present novel one-shot (single frame) and two-shot (double) imaging methods, which is insensitive to system noise, nonlinearity, object color reflectance, and ambient lights.

SUMMARY OF THE INVENTION

Accordingly, the present invention is directed to a method for generating structured-light pattern that substantially obviates one or more problems due to limitations and disadvantages of the related art.

An object of the present invention is to provide a method for generating a structured-light pattern that can obtain high-resolution real-time three-dimensional (3D) data by using a single frame (or one-shot) imaging or two frames (or two-shot) imaging methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for generating a structured-light pattern of a three-dimensional data obtaining system for obtaining three-dimensional data by projecting a structured-light having a predetermined pattern to an object and by capturing the object scene having the structured-light projected thereto, includes selecting a number of stripes k determining each subpattern from a number of colors N used in pattern synthesis (wherein N is usually equal to 3) and combining all of the subpatterns that can be used, the subpatterns in which any two consecutive stripes have different colors, and selecting a first subpattern, which is any one of the subpatterns among the subpatterns, identifying a second subpattern, which is a subpattern beginning with the color-stripe sequence from the second stripe to the last stripe of the first subpattern, and overlapping a first stripe of the second subpattern with the second stripe of the first subpattern, identifying a third subpattern, which is a subpattern beginning with the color-stripe sequence from the second stripe to the last stripe of the second subpattern, and overlapping a first stripe of the third subpattern with the second stripe of the second subpattern, and repeating the identifying and overlapping step so that every subpattern is used only once, thereby completing the generation of structured-light pattern.

In another aspect of the present invention, a method for generating a structured-light pattern of a three-dimensional data obtaining system for obtaining three-dimensional data by projecting a structured-light having a predetermined pattern to an object and by capturing the object scene having the structured-light projected thereto, includes selecting a number of stripes k determining each subpattern from a number of colors N used in pattern synthesis, having a number of possible spatial color transitions m (wherein m is equal to a number of color channels), under a condition wherein color transition is allowed in only a single channel among stripes adjacent to one another, combining all of the subpatterns that can be used, the subpatterns in which any two consecutive stripes have different colors, selecting a first subpattern, which is any one of the subpatterns among the subpatterns, identifying a second subpattern, which is a subpattern beginning with the color-stripe sequence from the second stripe to the last stripe of the first subpattern, and overlapping a first stripe of the second subpattern with the second stripe of the first subpattern, identifying a third subpattern, which is a subpattern beginning with the color-stripe sequence from the second stripe to the last stripe of the second subpattern, and overlapping a first stripe of the third subpattern with the second stripe of the second subpattern, and repeating the identifying and overlapping step so that every subpattern is used only once, thereby generating a first two-shot pattern, and reversing the first two-shot pattern (i.e., the minimum value to the maximum value, and the maximum value to the minimum value), so as to generate a second two-shot pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 illustrates intensity profiles of RGB stripes according to a related art;

FIGS. 4A to 4C respectively illustrates related art chromaticity diagrams of neutral object reflectances, dispersed chromaticities under RGB stripe illumination, and dispersed chromaticities under RGBCMY stripe illumination;

FIGS. 5A to 5C respectively illustrate another related art chromaticity diagrams of colored object reflectances, dispersed chromaticities under RGB stripe illumination, and dispersed chromaticities under RGBCMY stripe illumination;

FIG. 6 illustrates an RGB pattern for one-shot imaging, having 192 unique subpatterns, according to the present invention;

FIG. 7 illustrates GB patterns for two-shot imaging, having 256 unique subpatterns in each frame, according to the present invention;

FIGS. 8A to 8G illustrate experimental results of a human face according to the present invention;

FIGS. 9A to 9D illustrate experiments with a color panel according to the present invention;

FIGS. 10A to 10D respectively illustrate chromaticity plots according to the current invention.

FIGS. 11A and 11B illustrate two-shot imaging with a Rubik's cube according to the present invention;

FIGS. 12A to 12D respectively illustrate two-shot imaging with a cylindrical object according to the present invention.

FIG. 13 illustrates a flowchart of an embodiment of a method for generating a structured-light pattern of a three-dimensional data obtaining system for obtaining three-dimensional data by projecting a structured-light having a predetermined pattern to an object and by capturing the object scene having the structured-light projected thereto; and FIG. 14 illustrates a flowchart of an alternative embodiment of a method for generating a structured-light pattern of a three-dimensional data obtaining system for obtaining three-dimensional data by projecting a structured-light having a predetermined pattern to an object and by capturing the object scene having the structured-light projected thereto.

DETAILED DESCRIPTION OF THE INVENTION

Figure 1:
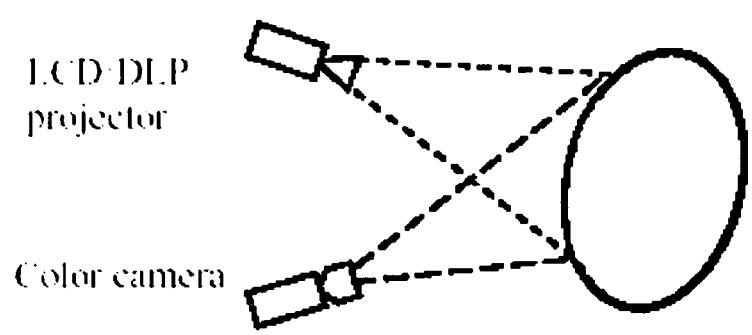
FIG. 1 illustrates a related triangulation-based structured-light range imaging system.

Reference will now be made in detail to the preferred embodiments of the present invention, examples of which are illustrated in the accompanying drawings. Wherever possible, the same reference numbers will be used throughout the drawings to refer to the same or like parts.

In color structured-light, the most straightforward method of generating unique color labels for M number of stripes would be to assign M number of different colors. In this case, the color distances between the stripes are small and this simple scheme can be as sensitive to system noise and non-linearity, such as the rainbow pattern, which is disclosed in J. Tajima and M. Iwakawa, "3-D data acquisition by rainbow range finder," Proc. $10^{th}$ ICPR, pp. 309-313, Atlantic City, N.J., 1990. A limited number of colors with substantial color differences are more desirable in this regard, but global uniqueness is hard to achieve due to the repeated appearance of a same color among M number of stripes, which is equal to the total number of stripes. In order to resolve this problem, a method of obtaining a uniqueness by a sequence of multiple stripes has been investigated accordingly. (See refs.: K. L. Boyer and A. C. Kak, "Color-encoded structured-light for rapid active ranging," IEEE Transactions on Pattern Analysis and Machine Intelligence 9, No. 1, 14-28, 1987., and L. Zhang, B. Curless, S. M. Seitz, "Rapid shape acquisition using color structured-light and multi-pass dynamic programming," $1^{st}$ International Symposium on 3D Data processing, Visualization, and Transmission, Padova, Italy, Jun. 19-21, 2002.) Instead of using one stripe for identification, a small number (e.g., k) of adjacent stripes can be used such that a sub-sequence of k consecutive stripes can be unique and identified within the entire stripe sequence.

It can be easily shown that $N^k$ different stripe sequences with the length k can be made from N different colors. When adjacent stripes are forced to have different colors, the number of possible sub-sequences is shown in Equation 1, which is also disclosed in K. L. Boyer and A. C. Kak, "Color-encoded structured-light for rapid active ranging," IEEE Transactions on Pattern Analysis and Machine Intelligence 9, No. 1, 14-28, 1987.

$$n(N, k) = N(N-1)^{k-1} \qquad \text{Equation 1:}$$

If a single stripe is used with 3 colors (i.e., N=3) colors, for example, only 3 stripe patterns are attainable. However, when forming a pattern by using a plurality of stripes, the number of uniquely identifiable patterns increases to 6, 12, 24, and 48 for k=2, 3, 4, and 5. The entire pattern should be generated such that any subpattern around a stripe can be uniquely labeled.

It may be noted that, with a binary BW pattern (N=2), it is impossible to increase the distinct labels in the method of generating subsequences since $n(2,k)=2\cdot(2-1)^{k-1}=2$. In other words, for one-shot imaging, the number of identifiable subpatterns remains fixed regardless of the length k. Hall-Holt and Rusinkiewicz used multiple frames in time for increasing the number of identifiable subpatterns with binary BW stripes, which is disclosed in "Stripe boundary codes for real-time structured-light range scanning of moving objects," Proc. ICCV, 2001.

If the color subpatterns are simply concatenated, not every stripe is uniquely identifiable, as disclosed in K. L. Boyer and A. C. Kak, "Color-encoded structured-light for rapid active ranging," IEEE Transactions on Pattern Analysis and Machine Intelligence 9, No. 1, 14-28, 1987. Therefore, in the present invention, the entire stripe pattern has been designed such that the windows of subpatterns overlap, so that every stripe can be identified by a unique subpattern of k consecutive stripes centered at the stripe.

In color selection for one-shot imaging, for obtaining a high-resolution ranging, the stripes should be as narrow as possible. For a given resolution limit from a set of projector and camera, the stripes can be more accurately detected with higher color contrast between the stripes. The most common choice of colors has been among red (R), green (G), blue (B), cyan (C), yellow (Y), magenta (M), black, and white. For the stripes that appear as thin as 1.5 to 2.0 pixels in the camera, the use of some colors may confound color stripe detection.

Figure 2:
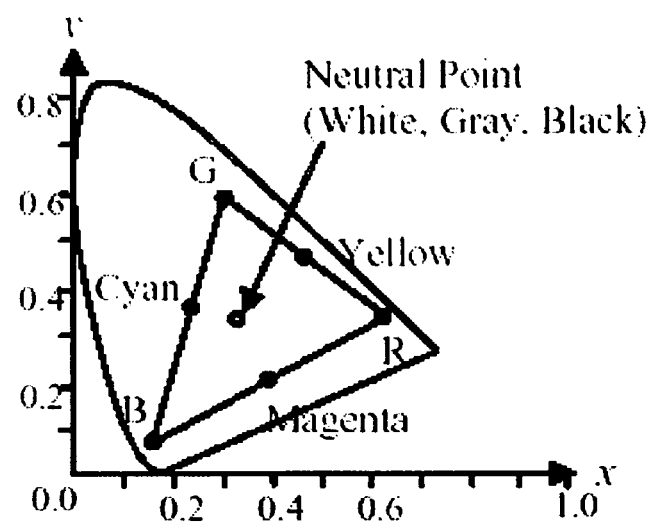
FIG. 2 illustrates a CIE-xy chromaticity diagram of colors according to a related art.

Hereinafter, the case of using only deeply saturated three primary colors R, G, and B will first be described, and the addition of other colors will be described in a later process. FIG. 2 illustrates a chromaticity space (or CIE-xy space). The colors that can be represented by the system RGB filter primaries are limited to the triangle shown in FIG. 2. For simplicity of the description, it will be assumed that the filter characteristics of the projector and camera are identical. The image irradiance in the camera $I(\lambda)$ can be represented as Equation 2 below.

$$I(\lambda) = g_\theta S(\lambda) E(\lambda), \qquad \text{Equation 2}$$

wherein S is the object reflectance, E is the illumination from the projector, and g is the geometric shading factor determined by the surface orientation and illumination angle. When object reflectances S are neutral, as shown in FIG. 4A, the received colors are determined by the projector illumination E (i.e., RGB stripe illumination), which splits the reflections from the neutral surfaces to the RGB points (i.e., the vertices in the chromaticity triangle), as shown in FIG. 4B. The one-dimensional hue value can be used effectively for separating the distinct colors. As the three stripe-illumination colors become more saturated (i.e., when colors having greater saturation and brightness), the image stripe chromaticities grow farther apart, thereby facilitating color distinction among one another.

For contiguous RGB stripes, colors other than R, G, and B appear in the image from the linear combination of RGB colors due to the limited bandwidth of the camera/projector system, as shown in FIG. 3. The linear combinations of RG, GB, and BR colors are generated at the boundaries. FIG. 4A illustrates neutral reflectance in the chromaticity triangle, and FIG. 4B illustrates the spread of the chromaticities at the boundaries. With only RGB illumination colors, thresholding by hue is effective in the presence of false boundary colors, as shown in FIG. 4B. Hue thresholding is also effective for the reflections from moderately colored object surfaces, as shown in FIG. 5. FIGS. 5A and 5B respectively illustrate the chromaticities of colored objects and spread chromaticities under RGB stripe illumination.

When the stripe width is 1.5 to 2.0 pixels, the pixels with the false colors around the stripe boundaries are substantial as compared to the stripe colors. When additional colors such as CMY are used, the false boundary colors significantly confound stripe detection and identification. This is because the CMY colors are linear combinations of the RGB primaries, which may cause confusion in the sub-sequence of the subpatterns. FIGS. 4C and 5C illustrate the chromaticity spreads under RGBCMY illumination from neutral and colored objects, respectively. As shown in the drawings, the additional false colors appear and there is no easy method of separating the false colors from the stripe colors.

Therefore, for high-resolution imaging, the use of only RGB colors results in the best resolution and the least errors. This restricts the number of color code N to 3. White can be added if surface shading is insignificant, and black may be added when ambient light is low. If object surfaces have substantially saturated colors, the reflectance chromaticities are dispersed so widely that even strong RGB stripes cannot separate the saturated colors for detection and additional information is required.

In the two-shot imaging method, when synchronized high-speed camera and projector are available, more than one frame can be used to discount the effects of highly saturated object colors and ambient illumination in range sensing. Many commercial cameras and projectors offer external trigger and frame refresh rate higher than 60 hertz (Hz). A two-shot imaging method that uses two video frames and stripes with highly saturated projector colors will now be described in detail.

When the projection of two light colors $E_1$ and $E_2$ alternates in time, two images can be obtained as shown in Equation 3 below.

$$I_1(\lambda)=g_\theta S(\lambda)[E_1(\lambda)+A(\lambda)],$$

$$I_2(\lambda)=g_\theta S(\lambda)[E_2(\lambda)+A(\lambda)], \quad \text{Equation 3}$$

wherein the effect of ambient illumination $A(\lambda)$ is included. Since it is assumed that objects are stationary during two consecutive video frames in a short time interval, g and S are common to both images.

Caspi et al. uses an additional image taken while the projector is turned off to estimate the influence of the ambient illumination, which is disclosed in "Range imaging with adaptive color structured-light," IEEE PAMI, Vol. 20, pp. 470-480, 1998. After discounting the ambient illumination, the ratio of the two images will be dependent only on the designed illumination colors without any influence of surface color and shading, as shown in Equation 4 below.

$$\frac{I_2(\lambda) - I_A(\lambda)}{I_1(\lambda) - I_A(\lambda)} = \frac{E_2(\lambda)}{E_1(\lambda)} \quad \text{Equation 4}$$

With the commonly used assumption of spectral smoothness in each color channel and some appropriate color calibration, which is described in "Range imaging with adaptive color structured-light," IEEE PAMI, Vol. 20, pp. 470-480, 1998., the responses in the color channels can be decoupled and analyzed independently with the following ratios:

$$\frac{R_2}{R_1}, \frac{G_2}{G_1}, \text{ and } \frac{B_2}{B_1}.$$

While this is an effective method of discounting object colors, if image values are in the linear range of projector and camera responses, many combinations of color ratios can be produced for stripes, the ratios become unstable, more specifically, when the image values are small due to small g and S values and when image values are clipped on highly reflective surfaces.

Instead of assigning many RGB projector colors and identifying them in the linear range, a small number of stripe signatures are investigated from the sign of color difference to reduce the sensitivity to light intensity and ambient light without the third image for the estimation of ambient light. From Equation 3, the difference between two images is given as shown in Equation 5 below.

$$\Delta I(\lambda) = I_1(\lambda) - I_2(\lambda) \quad \text{Equation 5}$$
$$= g_\theta S(\lambda)[E_1(\lambda) - E_2(\lambda)],$$
$$= g_\theta S(\lambda)\Delta E(\lambda)$$

wherein, the ambient illumination is discounted. In Equation 5, it can be seen that although I is significantly affected by g and S, the corresponding sign is not affected since g and S are both positive. A few stripe labels can be obtained from the sign of the image difference (or illumination difference of the two images).

When color channels are decoupled with the same color assumption, as described above and disclosed in "Range imaging with adaptive color structured-light," IEEE PAMI, Vol. 20, pp. 470-480, 1998, the differences of RGB channel values are as shown in Equation 6 below.

$$\Delta R = g_\theta S^R \Delta E^R,$$
$$\Delta G = g_\theta S^G \Delta E^G,$$
$$\Delta B = g_\theta S^B \Delta E^B, \quad \text{Equation 6}$$

wherein $S^R$, $S^G$, and $S^B$ are the object reflectances in R, G, and B channels, respectively, and $E^R$, $E^G$, and $E^R$ are the intensity of projection illumination in R, G, and B channels, respectively. From the positive and negative signs of R, G, and B, $2^3=8$ distinct codes can be obtained to assign in a projector stripe. When constructing subpatterns with N=8 n(N,k)=8*7^(k-1), unique subpatterns can be generated in accordance with Equation 1.

When designing subpatterns, however, it was observed that the spatial transition of colors over stripes in multiple channels (i.e., at least two channels) makes false colors because color channels are inconsistent and the false colors are not easily identifiable. If spatial color transition is only allowed in one of the RGB channels, only three types of transitions are allowed from one stripe to another. In this case, it can be shown that the number of unique subpatterns for the length k is given as shown in Equation 7 below.

$$n2(m,k)=2^m m^{k-1}, \quad \text{Equation 7}$$

wherein m is the number of possible spatial color transitions, e.g., m=3 for RGB colors and m=2 for GB colors.

To enhance good discriminability between the positive and negative signs, the intensity difference of projection color should be maximized. In the present invention, the minimum and maximum programmable values for the pattern of the two frames are used.

The channel value differences in Equation 6 are also affected by small values of g and S, but the influence is claimed to be much smaller with the difference than with the ratio for a given system noise. Furthermore, the effect of system nonlinearity and RGB color clipping (or excessive RGB colors) is much less pronounced with the signs of the difference. In order to demonstrate the efficacy of this approach, the above-described method is used in the experiments of the present invention with only two color channels, G and B (i.e., with $N=2^2=4$ codes).

In the multiple-stripe pattern synthesis and identification, the requirements for a program that generates the subpatterns will now be described. First, different colors or codes should be assigned to adjacent stripes to make distinguishable stripes. Then, the subpattern generated by the $i^{th}$ stripe should be different from any subpatterns generated up to the $(i-1)^{th}$ stripe. Furthermore, for the two-shot imaging, additional requirements should be included. More specifically, only one channel among RGB should make a color transition between the adjacent stripes. Finally, colors in each stripe in the second frame should be the reverse of those in the first frame in each channel. The reverse of the maximum value is equal to the minimum value. Conversely, the reverse of the minimum value is equal to the maximum value.

The process steps for generating a multiple-stripe color pattern according to the one-shot imaging method based on the above-described conditions will now be described in detail.

More specifically, one of the subpatterns generated from the permutations $\{n(N,k)=N(N-1)^{k-1}\}$ is selected, which is hereinafter referred to as a first subpattern for simplicity. Then, a second subpattern beginning with the color-stripe sequence from the second stripe to the last stripe of the first subpattern is selected. Subsequently, from the $1^{st}$ to the $(k-1)^{th}$ stripes of the second subpattern (or a randomly selected second pattern, in case there are more than one second subpatterns) overlap from the $2^{nd}$ to the $k^{th}$ stripes of the first subpattern. Thereafter, the above-described process is repeated until none of the unique subpatterns remain, thereby completing the process of generating patterns. Therefore, the entire pattern generated as described above is formed only of unique patterns, and the total number of stripes is equal to '$N(N-1)^{k-1}+k-1$'.

Meanwhile, the process steps for generating a multiple-stripe color pattern according to the two-shot imaging method will now be described in detail. In this case, one of the subpatterns generated from the permutations $\{n2(m,k)=2^m m^{k-1}\}$ is selected, which is hereinafter referred to as a first subpattern for simplicity. Then, a second subpattern beginning with the color-stripe sequence from the second stripe to the last stripe of the first subpattern is selected. Subsequently, from the $1^{st}$ to the $(k-1)^{th}$ stripes of the second subpattern (or a randomly selected second pattern, in case there are more than one second subpatterns) overlap from the $2^{nd}$ to the $k^{th}$ stripes of the first subpattern. Thereafter, the above-described process is repeated until none of the unique subpatterns remain, thereby completing the process of generating a first two-shot pattern. A second two-shot pattern is then completed by reversing each channel value of the first two-shot pattern generated by the above-described method (i.e., the minimum value to the maximum value, and the maximum value to the minimum value).

A selection can be made between the number M of total stripes to cover a scene and the number n(N,k) of stripes in a whole pattern. For high-resolution imaging M should be kept large and n(N,k) should be close to M for a unique encoding of all the stripes. Otherwise, the entire pattern should be repeated in the scene, and its subpatterns are not globally unique. In other words, when the N value is small, the length of the subpattern k should be large. However, wide subpatterns are not reliable near the object boundaries and occlusions. The best compromise made for the one-shot imaging is to have n(3,7)=192 when k=7 and to allow the pattern to appear twice when M=384. Stripe identification or unwrapping is not difficult since identical subpatterns appear only twice and they are far apart in the image. For the two-shot imaging with only GB channels, n2(2,7)=256 is selected. The generated patterns for one-shot and two-shot image are shown in FIGS. 6 and 7.

Stripe segmentation in the received image can mostly be performed based on two methods: stripe color classification and edge detection by color gradients. Both of the methods should work equivalently for imaging with thick stripes. However, for high frequency stripe imaging, color gradients are not stably detected after smoothing. Thus, it is preferable to use the stripe color classification method in the present invention.

Experiments have been carried out with a plurality of objects using the above-described one-shot and two-shot methods. A Sony XC-003 3-CCD 640×480 color camera and an Epson EMP-7700 1024×768 projector were used in the experiments according to the present invention. The encoded patterns are projected onto the various objects by the projector, and the camera captures the scene. No optimization algorithm for extracting stripe identification has been used in the experiments, since the direct color classification and decoding algorithms are sufficient. The projected patterns all consist of stripes with one-pixel width, and the width of stripes in the captured images is around 2 pixels. The RGB stripes with n(3,7)=192 have been used for one-shot imaging, and GB stripes with n2(2,7)=256 have been used, as described above.

FIGS. 8A to 8G illustrate the results from a human face with one-shot and two-shot imaging. More specifically, for one-shot imaging, FIGS. 8A, 8B, 8D, and 8F illustrate the subject under white projector illumination, pseudo-color display of identified stripes from subpatterns, stripe pattern projection, and the range image from the identified stripes, respectively. For two-shot imaging, FIGS. 8C, 8E, and 8G illustrate pseudo-color display of identified stripes from subpatterns, the two stripe patterns, and the range image from the identified stripes, respectively. Since the face has moderate colors, both of the methods show excellent results.

The one-shot and two-shot imaging has also been tested with a flat color panel with highly saturated color patches. FIGS. 9A to 9D illustrate the color panel under white light, one of the color panels for two-shot imaging, the range image from one-shot imaging, and the range image from two-shot imaging, respectively. As shown in the drawings, the strong colors significantly confound the one-shot imaging. FIGS. 10A to 10D respectively illustrate chromaticity plot from the human face, from the color panel under white light, from RGB stripe light, and the chromaticity plot of panel colors in GB space from two-shot imaging.

Referring to FIG. 10A, the face colors are moderate and sufficient for the one-shot imaging. However, the colors from the panel are very strong, and so the projection of RGB colors cannot be easily separated into different regions in the chromaticity of the one-shot imaging, as shown in FIGS. 10B and 10C. And, referring to FIG. 10D, separation can be easily performed by using a GB combination.

FIGS. 11A and 11B illustrate two-shot imaging with a Rubik's cube according to the present invention, wherein FIG. 11A illustrates a high-resolution image and FIG. 11B illustrates a high-resolution range image using the method according to the present invention. And, FIGS. 12A to 12D respectively illustrate two-shot imaging with a cylindrical object (i.e., FIG. 12A) according to the present invention by using a color image, one of the two stripe patterns (i.e., FIG. 12B), the range image with the method according to the present invention, and the range image with the method disclosed in D. Caspi, N. Kiryati and J. Shamir, "Range imaging with adaptive color structured-light," IEEE PAMI, Vol. 20, pp. 470-480, 1998. Herein, the result of range image, in the two-shot imaging with the cylindrical object, by using the method according to the present invention is compared with that of the method disclosed in "Range imaging with adaptive color structured-light," IEEE PAMI, Vol. 20, pp. 470-480, 1998. It can be seen that the method according to the present invention is more advantageous. More specifically, the data obtained by using the method according to the present invention has a more enhanced reliability in the bright and dark regions.

FIGS. 13 and 14 illustrate embodiments of a method for generating a structured-light pattern of a three-dimensional data obtaining system for obtaining three-dimensional data by projecting a structured-light having a predetermined pattern to an object and by capturing the object scene having the structured-light projected thereto.

As described above, the method for generating the structured-light pattern according to the present invention has the following advantages.

By selecting a small number of colors by using a difference in hue, color stripes that are insensitive to noise or surface color can be detected. And, by increasing the number of possible subpatterns that can be used in the multiple-stripe pattern to a maximum number, high-resolution three-dimensional data can be obtained by using a single frame.

Furthermore, in case of objects having a strong surface color, only two frames can be used to obtain high-resolution three-dimensional data through a color difference between a preceding frame and a subsequent frame.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a method for generating a structured-light pattern of a three-dimensional data obtaining system for obtaining three-dimensional data by projecting a structured-light having a predetermined pattern to an object and by capturing the object scene having the structured-light projected thereto, the method comprising:
    selecting a number of stripes k determining each subpattern from a number of colors N used in pattern synthesis (wherein N is usually 3) and combining all of the subpatterns that can be used, the subpatterns in which any two consecutive stripes have different colors; and
    selecting a first subpattern, which is any one of the subpatterns among the subpatterns, identifying a second subpattern, which is a subpattern beginning with the color-stripe sequence from the second stripe to the last stripe of the first subpattern, and overlapping a first stripe of the second subpattern with the second stripe of the first subpattern, identifying a third subpattern, which is a subpattern beginning with the color-stripe sequence from the second stripe to the last stripe of the second subpattern, and overlapping a first stripe of the third subpattern with the second stripe of the second subpattern, and repeating the identifying and overlapping step so that each of the subpatterns that can be used is overlapped with another, thereby completing the generation of structured-light.

2. The method according to claim 1, wherein a plurality of colors used in the pattern synthesis includes red (R), green (G), and blue (B), and wherein a color difference for each of the colors is taken into consideration.

3. The method according to claim 2, wherein the color red (R) is strong pure red having a color saturation value of (255, 0, 0), wherein the color green (G) is strong pure green having a color saturation value of (0, 255, 0), and wherein the color blue (B) is strong pure blue having a color saturation value of (0, 0, 255).

4. The method according to claim 1, wherein when the number of colors N is fixed, a total number of possible subpatterns is decided based on the value k (wherein k represents a number of stripes determining each subpattern).

5. The method according to claim 1, wherein the total number of possible subpatterns is equal to $N(N-1)^{k-1}$.

6. In a method for generating a structured-light pattern of a three-dimensional data obtaining system for obtaining three-dimensional data by projecting a structured-light having a predetermined pattern to an object and by capturing the object scene having the structured-light projected thereto, the method comprising:
    selecting a number of stripes k determining each subpattern from a number of colors N used in pattern synthesis, having a number of possible spatial color transitions m (wherein m is equal to a number of color channels), under a condition wherein color transition is allowed in only a single channel among stripes adjacent to one another, combining all of the subpatterns that can be used, the subpatterns in which any two consecutive stripes have different colors;
    selecting a first subpattern, which is any one of the subpatterns among the subpatterns, identifying a second subpattern, which is a subpattern beginning with the color-stripe sequence from the second stripe to the last stripe of the first subpattern, and overlapping a first stripe of the second subpattern with the second stripe of the first subpattern, identifying a third subpattern, which is a subpattern beginning with the color-stripe sequence from the second stripe to the last stripe of the second subpattern, and overlapping a first stripe of the third subpattern with the second stripe of the second subpattern, and repeating the identifying and overlapping step so that each of the subpatterns that can be used is overlapped with another, thereby generating a first two-shot pattern; and
    reversing the first two-shot pattern (i.e., the minimum value to the maximum value, and the maximum value to the minimum value), so as to generate a second two-shot pattern.

7. The method according to claim 6, wherein each of the colors used in the pattern synthesis is formed of a combination of a minimum value and a maximum value of each color channel, and wherein the colors include red (R), green (G), blue (B), cyan (C), magenta (M), yellow (Y), white (W), and black (K).

8. The method according to claim 7, wherein a channel related to a corresponding color is given a maximum value, and a channel not related to the corresponding color is given a minimum value.

9. The method according to claim 6, wherein the number of colors N used in the pattern synthesis is decided by using the number of color channels m as the equation $N=2^m$, wherein N=2, 4, and 8 when m=1, 2, and 3.

10. The method according to claim 6, wherein when the number of color channels m is a fixed value, and hence the number of colors N is also fixed by $N=2^m$, a total number of possible subpatterns is determined by k (wherein k is equal to a number of stripes determining each subpattern).

11. The method according to claim 6, wherein the total number of subpatterns that can be used is equal to $n2(m,k)=2^m m^{k-1}$.

* * * * *